(12) United States Patent
Lim

(10) Patent No.: US 6,910,554 B2
(45) Date of Patent: Jun. 28, 2005

(54) CALIPER ASSEMBLY FOR A DISC BRAKE

(75) Inventor: Kyung-Kyu Lim, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 0 days.

(21) Appl. No.: 10/745,569

(22) Filed: Dec. 29, 2003

(65) Prior Publication Data

US 2005/0103582 A1   May 19, 2005

(30) Foreign Application Priority Data

Nov. 18, 2003   (KR) .................. 10-2003-0081608

(51) Int. Cl.[7] ............................................. F16D 65/38
(52) U.S. Cl. .................................. 188/73.35; 188/71.1
(58) Field of Search ........................... 188/71.1, 72.4, 188/73.31, 73.35, 73.36, 73.37, 73.39

(56) References Cited

U.S. PATENT DOCUMENTS

| | | | | |
|---|---|---|---|---|
| 4,840,255 A | * | 6/1989 | Murakami et al. | ........ 188/73.35 |
| 5,036,932 A | * | 8/1991 | Schonenberger | ........... 188/71.1 |
| 5,860,496 A | | 1/1999 | Kullman et al. | |
| 6,189,659 B1 | | 2/2001 | Doi et al. | |
| 6,257,378 B1 | | 7/2001 | Girkin et al. | |
| 6,397,982 B2 | * | 6/2002 | Rancourt | .................. 188/73.31 |

FOREIGN PATENT DOCUMENTS

JP   08105467 A   *   4/1996   ............ F16D 65/02

* cited by examiner

*Primary Examiner*—Xuan Lan Nguyen
(74) *Attorney, Agent, or Firm*—Greenblum & Bernstein, P.L.C.

(57) ABSTRACT

A caliper assembly for a disc brake is capable of inhibiting eccentric abrasion of pads without a factor of increasing additional costs and the resultant noise and vibration generated when a brake is actuated.

4 Claims, 3 Drawing Sheets

[FIG. 2]
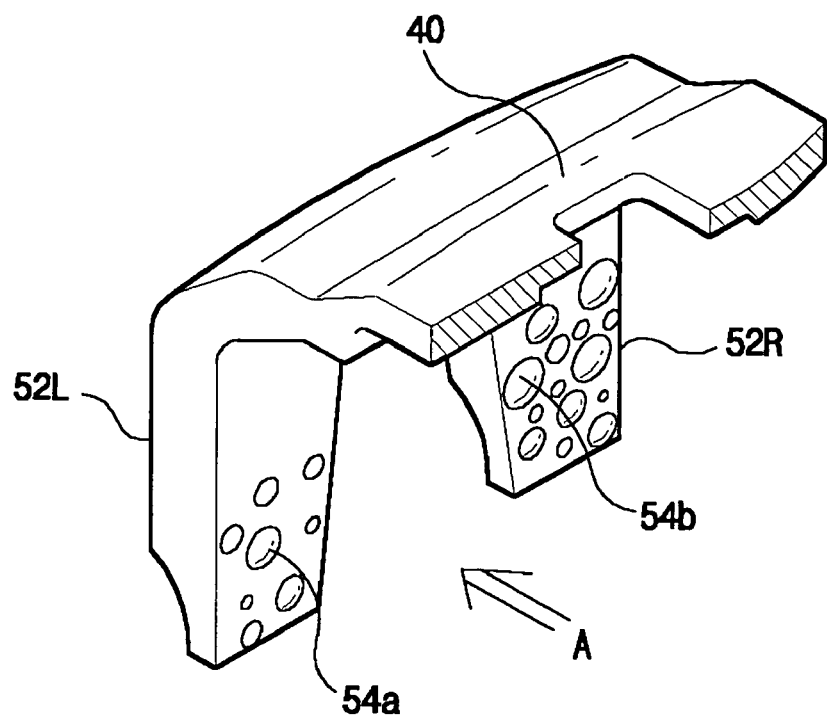
[FIG. 3]
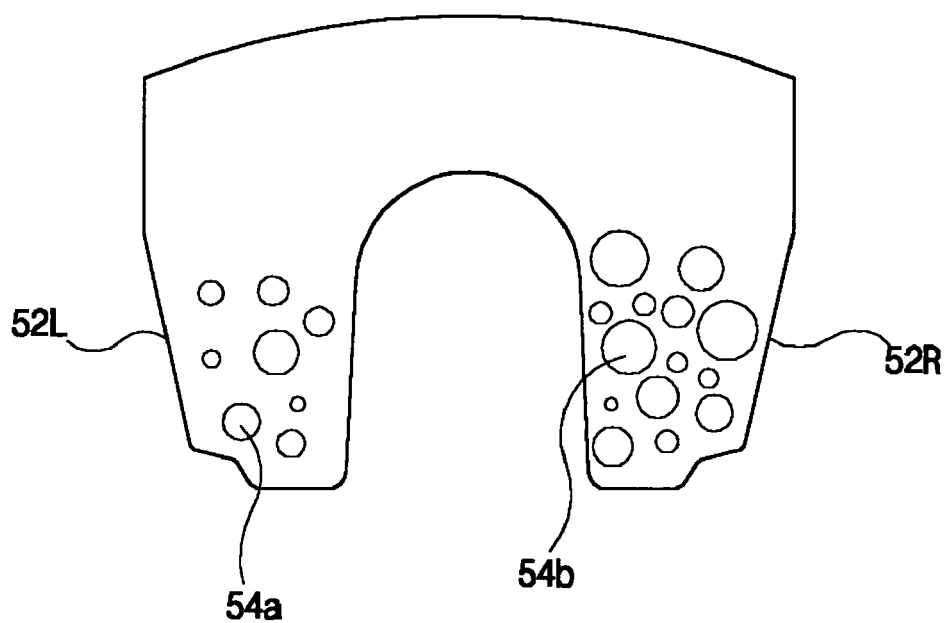

[FIG. 4]
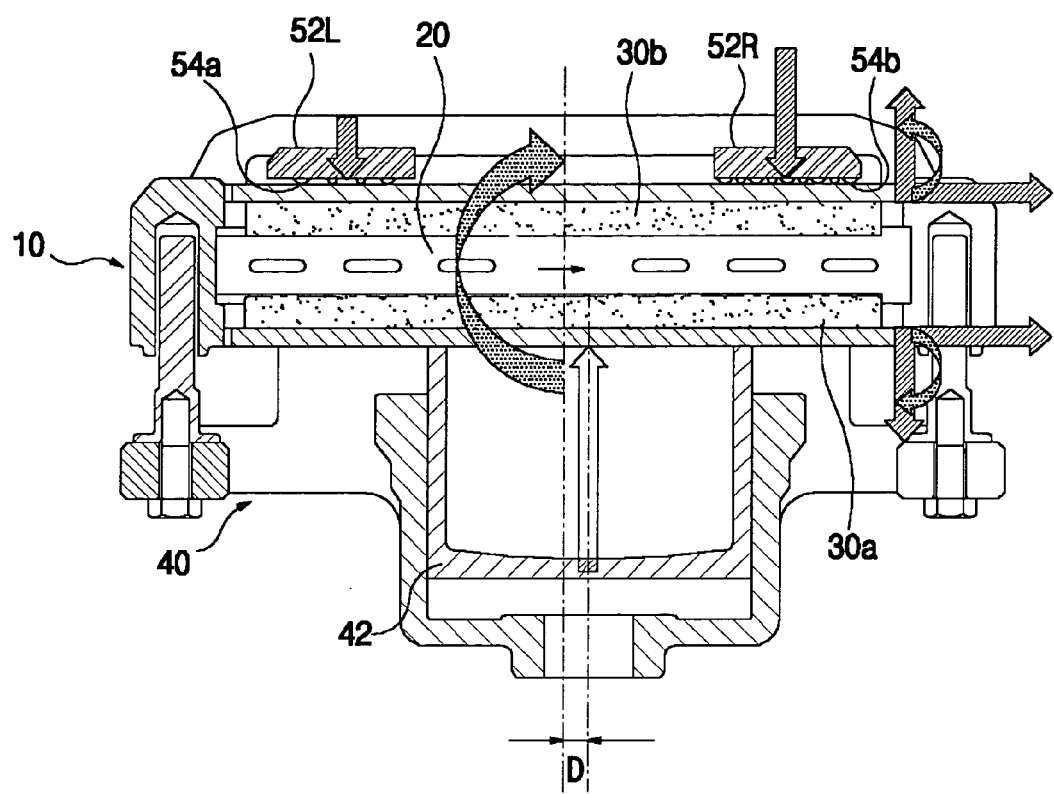

CALIPER ASSEMBLY FOR A DISC BRAKE

RELATED APPLICATIONS

The present disclosure relates to subject matter contained in priority Korean Application No. 10-2003-0081608, filed on Nov. 18, 2003, which is herein expressly incorporated by reference in its entirety.

BACKGROUND OF THE INVENTION

1. Field of the Invention

The present invention relates to a caliper assembly for a disc brake, and more particularly to a caliper assembly for a disc assembly capable of effectively inhibiting eccentric abrasion of pads as well as resultant noise, vibration and so on when a brake is actuated without an increase of additional costs.

2. Description of the Related Art

As well known, a disc brake in the vehicle is provided with a caliper assembly mounted to a disc in a form of straddling a saddle so as to press the disc to generate brake power when being actuated.

Such a caliper assembly is specifically described in U.S. Pat. No. 5,860,496, No. 6,257,378, etc. as example, and includes a carrier fixed to a body, a pair of pads disposed inside the carrier and pressing both surfaces of a disk rotated together with a wheel to generate brake power, and a caliper housing in which a piston is housed.

The pads consist of an inner pad on a piston side and an outer pad on the side opposite to the inner pad. The inner and outer pads are fixedly attached to an inner pad plate and an outer pad plate, respectively.

The caliper housing comprises a bore finished to allow the piston to move forward or backward in the center of a rear part, and a pair of fingers curvedly formed downward on a front part and wrapping the outer pad plate.

The bore has an inner circumferential surface fitted with a seal made of an elastic material so as to restore the piston when a brake fluid pressure is released. The caliper housing is provided about the bore in a surface symmetrical manner.

The disc is disposed so that its outer periphery is partly inserted between the inner pad and the outer pad, and rotates together with the wheel with a predetermined gap maintained from the inner and outer pads when there is no brake action.

In the case where a vehicle having the disc brake constructed as above travels, when its driver steps on a brake pedal, the brake fluid pressure generated from a master cylinder is transmitted inside the bore through a hydraulic line.

Then, the piston goes forward due to transmission of the fluid pressure, and the inner pad plate is pushed toward the disc. Thus, the inner pad is closely pressed on the disc to generate the brake power.

Further, because the fluid pressure is left in the bore, the caliper housing itself moves in the opposite direction. Thereby, the pair of fingers push the outer pad plate toward the disc, and the outer pad is closely pressed and exert on the disc.

When the driver steps off the brake pedal, the piston is restored due to an elastic force of the seal, and the outer pad and the inner pad are spaced apart from the disc again in a predetermined interval.

Meanwhile, for the disc brake as mentioned above, in the case of repeating the brake operation for a long time, eccentric abrasion is generated on a rear side of the inner and outer pads due to momentum caused by a rotational torque. This is responsible for noise and vibration when the brake is actuated.

To prevent this rear-side eccentric abrasion of the pads, U.S. Pat. No. 6,189,659 proposed to eccentrically dispose the piston and the finger pair toward the front side of the disc rotational direction from a center lines of the inner and outer pads, and to balance a force acting on each pad to be uniformly abraded.

However, the conventional caliper assembly structure essentially requires separate finishing processes for varying a shape or a mounting position of each finger so as for each finger to be eccentrically disposed from the centerline of the outer pad. Thus, in terms of the finishing processes, a separate management is needed. This imposes a direct burden on product costs, which is regarded to be unreasonable.

SUMMARY OF THE INVENTION

To solve the above-indicated problems, it is, therefore, an object of the present invention to provide a caliper assembly for a disc brake, in which front and rear side fingers of a caliper housing contacted with an outer pad are differently embossed to have different contact areas, thereby being capable of inhibiting noise and vibration when a brake is braked without an increase of additional costs.

To achieve the above object, there is provided a caliper assembly for a disc brake, comprising: a carrier fixed to a body; an inner pad disposed inside the carrier to rub against one surface of a rotating disc; an outer pad disposed opposite to the inner pad to rub against the other surface of the disc; a caliper housing in which a piston for pressing the inner pad is housed and mounted to allow linear movement relative to the carrier; and a pair of fingers formed on one side of the caliper housing to wrap the outer pad, wherein each of the fingers has a plurality of embossings protruded toward the outer pad, and the embossings formed on the front side finger in a clockwise rotation direction of the disc are formed to make an area contacting with the outer pad wider than the embossings formed on the rear side finger.

According to the foregoing construction, when the disc brake is braked, a surface pressure acting on the outer pad by the front side finger of the caliper housing is greater than that acting on the outer pad of the rear side finger. Thus, force equilibrium is maintained with momentum acting on a rear side of the outer pad by a rotational torque of the disc, so that eccentric abrasion of the outer pad is inhibited.

Further, in order to prevent eccentric abrasion of the outer pad as mentioned above, the embossings are formed on the front and rear fingers in advance during casting the caliper housing. Thus, it is possible to manufacture the caliper assembly without separate finishing processes compared with the general floating caliper assembly. Further, it is possible to reduce momentum acting on the outer pad without an increase of additional costs and to prevent noise and vibration when the disc brake is broken.

The piston is disposed to be offset at a predetermined distance on a front side from a center of the inner pad.

With this construction, when the disc brake is actuated, a relatively great surface pressure acts on a front side of the inner pad by means of the offset piston. Thus, a force equilibrium is maintained with momentum acting on a rear side of the inner pad, so that abrasion is uniformly generated. Further, it is possible to prevent the outer and inner pads from being eccentrically abraded.

The embossings are formed during casting the caliper housing.

With this construction, it is unnecessary to separately design and manufacture a new caliper housing in order to change a shape and a position of the fingers as in the prior art. It is possible to obtain the same effects only through a simple finishing process for forming the embossings on a die for forming the existing caliper housing. Thus, it is possible to save costs according to product manufacturing.

BRIEF DESCRIPTION OF THE DRAWINGS

The above objects, features and advantages of the present invention will become more apparent from the following detailed description when taken in conjunction with the accompanying drawings, in which:

FIG. 2 is a perspective view showing a detailed structure of the fingers illustrated in FIG. 1;

FIG. 3 is a front view of FIG. 2; and

FIG. 4 is a conceptional view for explaining a principle of preventing eccentric abrasion of a pad according to the present invention.

DETAILED DESCRIPTION OF THE PREFERRED EMBODIMENT

Figure 1:
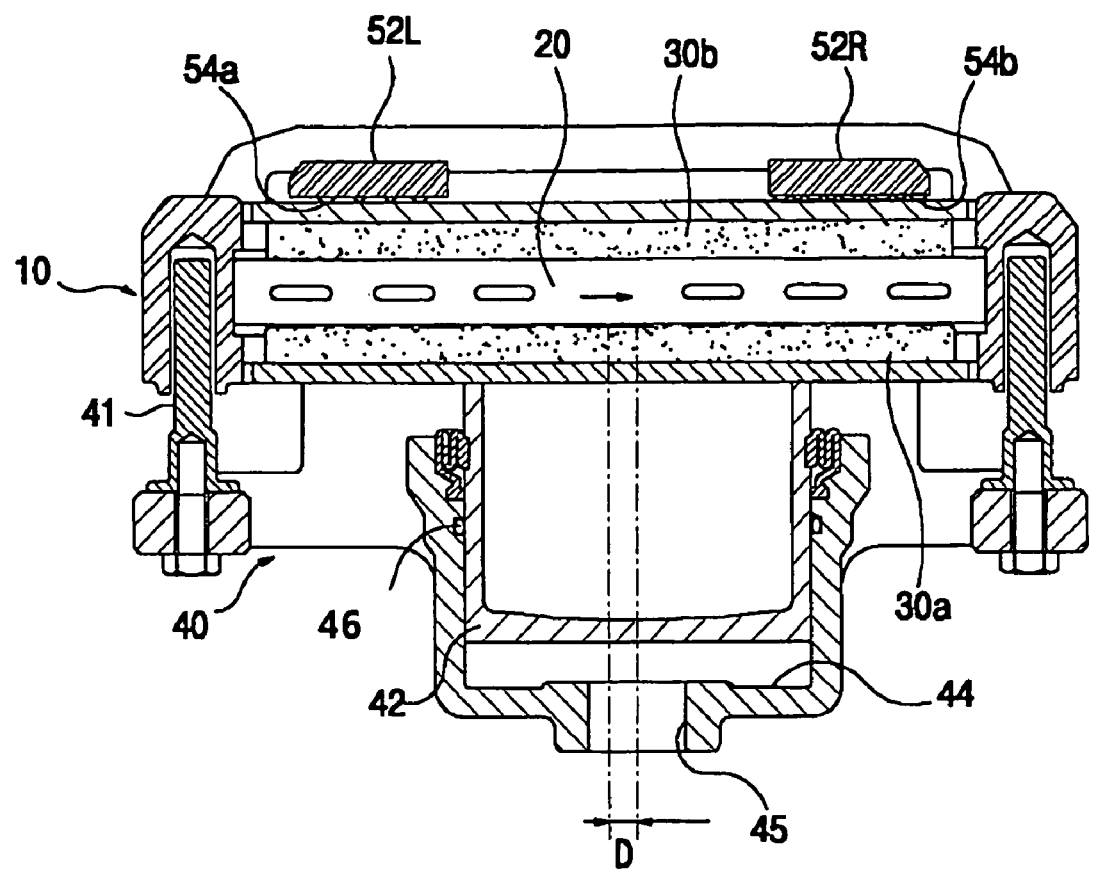
FIG. 1 is a cross-sectional view illustrating a cross-sectional structure of a caliper assembly for a disc brake according to one embodiment of the present invention.

A preferred embodiment of the present invention will now be described with reference to the accompanying drawings. In the following description, same drawing reference numerals are used for the same elements even in different drawings. The matters defined in the description such as a detailed construction are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a cross-sectional view illustrating a cross-sectional structure of a caliper assembly for a disc brake according to one embodiment of the present invention.

Referring to FIG. 1 a caliper assembly for a disc brake according to the present invention includes a carrier 10 fixed to a body (not shown), inner and outer pads 30a and 30b disposed in the carrier 10 at a predetermined spaced interval, and a caliper housing 40 retractably mounted to the carrier in a slidable manner.

The inner and outer pads 30a and 30b are symmetrically disposed in the carrier 10 with a disc 20 interposed, and press both surfaces of the rotating disc 20 to generate brake power when a brake is braked.

The caliper housing 40 is slidably mounted on opposite ends of the carrier 10 through a guide rod 41, and is housed with a piston 42 moving forward or backward by means of a brake fluid pressure on one side thereof.

Further, the one side of the caliper housing 40 is formed with a finished bore 44 so as for the piston 42 to be received, while the other side is provided with a pair of fingers 52L and 52R formed to surround the outer pad 30b.

Here, the bore 44 is eccentrically finished by a predetermined distance D in a clockwise rotation direction of the disc 20 (an arrow direction, or a forward direction of a vehicle) about the centerline of the inner pad 30a. Thus, the piston 42 received in the bore 44 performs forward or backward movement in the offset state from the center of the inner pad 30a.

FIG. 2 is a perspective view showing a detailed structure of the fingers 52L and 52R provided to the caliper assembly of FIG. 1, and FIG. 3 is a front view seen from the direction A of FIG. 2.

As shown in FIGS. 2 and 3, according to a characteristic structure of the present invention, inner surfaces of the fingers 52L and 52R are each formed with a plurality of embossings 54a and 54b protruded toward the outer pad 30b.

Here, of the embossings 54a and 54b, the embossings 54b formed on the front side finger 52R of the clockwise rotation direction of the disc 20 are formed to have a contact area contacted with the outer pad 30b wider than that of the embossings 54a formed on the rear side finger 52L.

In this manner, in order for the fingers 52L and 52R to have different contact areas with respect to the outer pad 30b, the embossings 54b of the front side finger 52R may be formed to be larger than the embossings 54a of the rear side finger 52L.

Alternatively, the number of the embossings 54b of the front side finger 52R may be formed to be more than that of the embossings 54a of the rear side finger 52L.

As such, the embossings 54a and 54b formed on the fingers 52L and 52R are formed together during casting the caliper housing 40 after a simple finishing process for forming the embossings 54a and 54b is performed to a die for forming the caliper housing 40.

Thus, it is unnecessary to separately design and manufacture a new caliper housing in order to vary a shape and a position of the fingers 52L and 52R as in the prior art. Further, because the same effects can be obtained by performing a simple finishing process for forming the embossings 54a and 54b to a die for forming an existing caliper housing, it is possible to realize cost saving according to product manufacturing.

A reference numeral 45 not described is a hydraulic port finished to communicate with the bore 44 so that a brake fluid pressure is transmitted, and 46 is a seal fitted on an inner periphery of the bore 44 to restore the piston 42 with a self elastic force.

Hereinafter, an operation of the present invention having the foregoing construction will be described.

FIG. 4 illustrates a distribution of force acting on the surroundings of the inner and outer pads 30a and 30b when the disc brake is braked in accordance with the present invention, particularly, a principle for preventing eccentric abrasion of the outer pad 30b which is caused by different contact areas between the finger 52L or 52R and the outer pad 30b.

Referring to FIG. 4, first, when its driver steps on a brake pedal (not shown) while a vehicle is traveling, a brake fluid pressure is generated from a master cylinder and then transmitted into the bore 44 through the hydraulic port 45 to forward the piston 42.

Then, the inner pad 30a presses one surface of the rotating disc 20 as the piston 42 goes forward, and thus a braking force is generated.

Here, a load applied by the piston 42 acts on an eccentric position D offset at a predetermined distance in a clockwise direction (or, on the right side in the figure) of the disc 20 from the centerline of the inner pad 30a.

Therefore, a relatively great surface pressure acts on the front side of the inner pad 30a to generate a rotational torque. Force equilibrium is maintained between the rotational torque and momentum acting on the rear side of the inner pad 30a, so that the inner pad 30a is uniformly abraded.

Meanwhile, as the caliper housing 40 moves in the opposite direction to the piston 42 by means of the fluid pressure remaining in the bore 44, the fingers 52L and 52R pulls the outer pad 30b to press and rub against the other surface of the disc 20.

In this case, the embossings 54b of the front side finger 52R come into contact with the outer pad 30b with a larger contact area than the embossings 54a of the rear side finger 52L, so that the surface pressure caused by the front side finger 52R acts on the outer pad 30b stronger than that caused by the rear side finger 52L.

Thus, the surface pressure acting relatively strongly on the front side of the outer pad 30b maintains the force equilibrium with the momentum acting the rear side of the outer pad by means of the rotational torque of the disc 20, so that the outer pad 30b is uniformly abraded.

As can seen from the operation of the present invention, the eccentric abrasion of the inner pad 30a can be reduced by the offset of the piston 42, and the eccentric of the outer pad 30b can be inhibited by the different contact areas between the embossings 54a formed on the front side finger 52L and the outer pad 30b and between the embossings 54b formed on the rear side fingers 52R.

Further, even when the disc brake is repeatedly braked, the inner and outer pads 30a and 30b are uniformly abraded as a whole, so that it is possible to remarkably reduce noise, vibration and so on.

As set forth above, although the invention has been shown and described with reference to certain preferred embodiments thereof, it will be understood by those skilled in the art that various changes in form and details may be made therein without departing from the spirit and scope of the invention as defined by the appended claims.

According to the present invention having the foregoing construction, since the surface pressure acting on the outer pad by the front side finger of the caliper housing is greater than that by the rear side finger when the brake is braked, the surface pressure by the front side finger maintains the force equilibrium with the momentum acting on the rear side of the outer pad by the rotational torque of the disc. Thus, the eccentric abrasion of the outer pad is inhibited.

Further, in order to prevent the eccentric abrasion of the outer pad as mentioned above, because the embossings are formed on the front and rear side fingers in advance during casting the caliper housing, it is possible to manufacture the caliper assembly without separate finishing processes compared with the conventional floating caliper assembly. Thus, it is possible to reduce the momentum acting on the outer pad without a burden on separate costs and to prevent noise and vibration from being generated when the brake is actuated.

In addition, by disposing the piston to be offset at a predetermined distance on the rear side from the center of the inner pad, the relatively great surface pressure acts on the front side of the inner pad by the offset piston when the disc brake is braked, thus maintaining the force equilibrium with the momentum acting on the rear side of the inner pad to generate uniform abrasion. Thus, no eccentric abrasion occurs at the outer pad as the inner pad.

Further, by forming the embossings of the fingers during casting the caliper housing, it is unnecessary to separately design and manufacture new caliper housings in order to vary a shape and a position of the fingers. Thus, the same effects can be accomplished only through the simple finishing processes for forming the embossings on the die for forming the existing caliper housing, it is possible to realize cost saving according to manufacture of products.

What is claimed is:

1. A caliper assembly for a disc brake, comprising:
   a carrier fixed to a body;
   an inner pad disposed inside the carrier to rub against one surface of a rotating disc;
   an outer pad disposed opposite to the inner pad to rub against the other surface of the disc;
   a caliper housing in which a piston for pressing the inner pad is housed and mounted to allow linear movement relative to the carrier; and
   a pair of fingers formed on one side of the caliper housing to wrap the outer pad,
   wherein each of the fingers has a plurality of embossings protruded toward the outer pad, and the embossings formed on the front side finger in a clockwise rotation direction of the disc are formed to make an area contacting with the outer pad wider than the embossings formed on the rear side finger, and
   wherein the embossings on the front side finger are greater in number than the embossings on the rear side finger.

2. The caliper assembly as claimed in claim 1, wherein the piston is offset at a predetermined distance on a front side from a center of the inner pad.

3. The caliper assembly as claimed in claim 1, wherein the embossings are formed during casting of the caliper housing.

4. The caliper assembly as claimed in claim 2, wherein the embossings are formed during casting of the caliper housing.

* * * * *